United States Patent [19]
Tella

[11] Patent Number: 4,557,623
[45] Date of Patent: Dec. 10, 1985

[54] ROBOTIC WRIST

[76] Inventor: Richard P. Tella, Hartford Ave., Wakefield, R.I. 02879

[21] Appl. No.: 457,522

[22] Filed: Jan. 13, 1983

[51] Int. Cl.$^4$ .............................................. F16D 3/80
[52] U.S. Cl. .......................................... 403/31; 92/24; 92/DIG. 2; 403/40; 403/56; 403/90; 414/4
[58] Field of Search .................... 403/56, 90, 144, 122, 403/39, 40, 31; 92/DIG. 2, 24, 27, 28, 120; 414/4

[56] References Cited

U.S. PATENT DOCUMENTS

| | | | |
|---|---|---|---|
| 2,710,234 | 6/1955 | Hansen | 92/DIG. 2 |
| 3,158,071 | 11/1964 | Gut | 403/56 X |
| 3,264,943 | 8/1966 | Schmitt | 92/28 |

FOREIGN PATENT DOCUMENTS 13253  2/1977  Japan ................................. 294/86.4

*Primary Examiner*—Thomas F. Callaghan
*Attorney, Agent, or Firm*—Thompson, Birch, Gauthier & Samuels

[57] ABSTRACT

An accommodating linkage device which operates in three modes to provide, upon command, either: (1) a standard, resetable, rigid linkage between two objects; (2) a flexible linkage which responds to relative motion (forces) between two objects; (3) or an arbitrary, rigid linkage between two objects. The device includes two ball joints which connect to the two objects, a pair of locking pistons, and a pair of alignment pistons. Operation of the device is in response to either control signals or to forces generated by the relative motion of the two objects, depending upon operating mode.

13 Claims, 4 Drawing Figures

ROBOTIC WRIST

BACKGROUND AND BRIEF SUMMARY OF THE INVENTION

The invention relates generally to robotics and is concerned in particular with an improved apparatus for manipulating workpieces and the like.

There are a wide variety of manufacturing operations which involve the handling and processing of individual workpieces. The workpiece may be carried sequentially through a plurality of workstations where various tasks may be performed such as stamping, deburring, dipping, etc.

If the workpiece is completely released at a workstation, after being retrieved the workpiece usually must be reoriented to a known attitude and position before further processing can take place, this takes time. In such manufacturing operations, it is desirable to maintain hold of the workpiece as it is processed, both to control the location of the workpiece as it is introduced into a workstation and to save the time needed to regrasp the finished piece.

The known automated workpiece handling systems are generally used where there is no need to control the location of the workpiece by the manipulator or where the finished piece need not be regrasped after processing. One of the reasons for this is that the manipulators in these systems are rigid and massive. They are not designed to be compliant and to accomodate the shock force that may be produced at a workstation for example by a press. Further, they cannot release and regrasp the workpiece with sufficient speed to be particularly advantageous. There are manufacturing operations where it would be desirable both to rigidly grasp the workpiece and move it to a workstation, and at the workstation, to relax the grip on the workpiece such that during a stamping operation or the like, the workpiece could move while the gripper maintained its grasp on the workpiece.

Our invention accomplishes the foregoing by providing a linkage device which is advantageously secured at one end to a robot arm and secured at the other end to a gripper, which gripper holds a workpiece. The linkage device, upon command, provides for relative angular movement between its ends and therefore between the workpiece and the robot arm. When the workpiece is subjected to shock the linkage absorbs the shock.

Our invention in a preferred embodiment provides a linkage device having a first link secured to a first object, such as a robot arm, and a second link secured to a second object, such as a gripper which holds a workpiece. The first and second links are disposed in a housing and adapted for relative angular motion one to the other. The device further includes locking pistons to rigidly secure the links within the housing; and alignment rings to reorient the links. The device functions in at least one of three modes; a locking mode to provide a rigid linkage between the objects; an air bearing mode which provides a flexible linkage between the objects; and an alignment mode to provide a standard resettable linkage between the objects.

DESCRIPTION OF THE PREFERRED EMBODIMENT

The preferred embodiment will be described in reference to the linkage device functioning as a wrist and having secured to one end a workpiece gripper and being secured at the other end to a robot arm.

Figures 1, 3, 4:
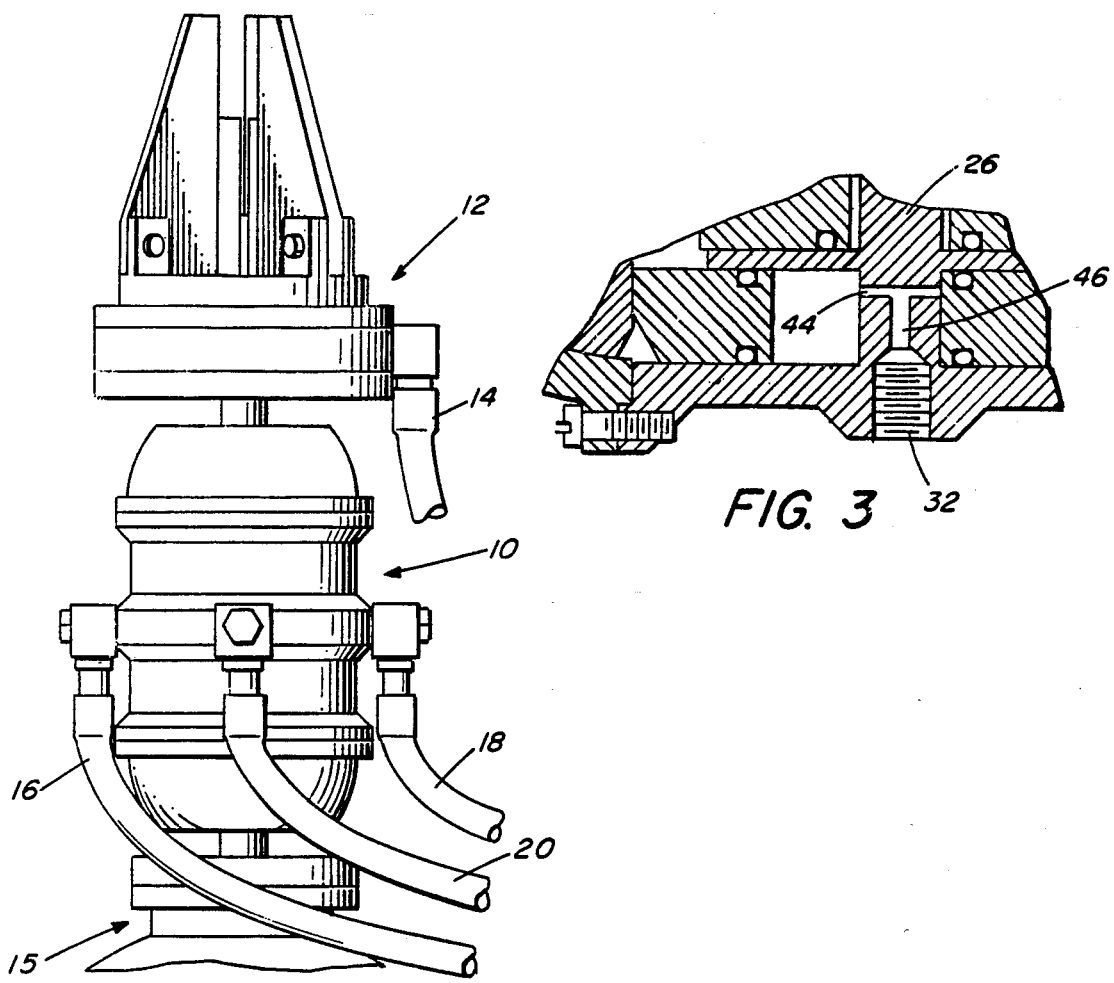
FIG. 1 is a schematic of a linkage device embodying the invention joined at one end to a workpiece gripper and at the other end to a robot arm.
FIG. 3 is a fragmentary sectional view of the linkage device.
FIG. 4 is a top view of the linkage device.

Referring to FIG. 1, a wrist 10 at one end is connected to a three-fingered gripper 12 which is a standard device. A pneumatic line 14, communicates with the gripper 12. The wrist 10 is secured at its other end to the arm 15 of a robot (not shown). Three pneumatic lines are joined to the wrist, line 16 communicates with an air bearing port; line 18 communicates with an alignment port; and line 20 communicates with a locking port.

Figure 2:
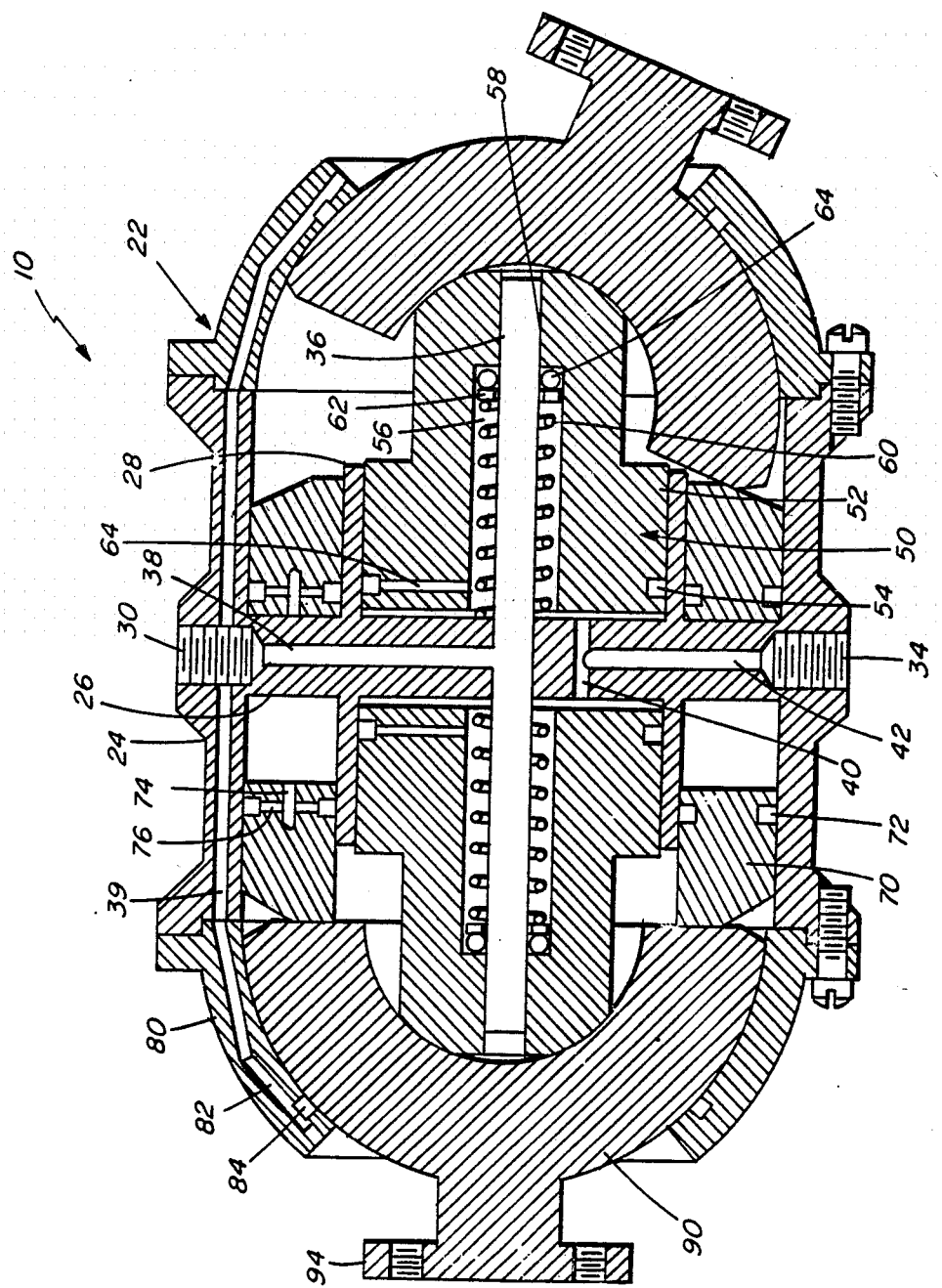
FIG. 2 is a side schematic view of the linkage device.

Referring to FIG. 2, the wrist 10 comprises a housing 22 having an outer cylindrical wall 24 and an inwardly extending support plate 26 which bisects the wrist 10. An inner cylindrical wall 28 is concentrically aligned with the outer cylindrical wall 24 and is joined to the support plate 26.

Referring to FIG. 4, the outer cylindrical wall includes three ports, an air bearing port 30, an alignment port 32, and a locking port 34. Only ports 30 and 34 are shown in FIG. 2; port 32 is shown in FIG. 3.

The plate 26 is characterized by a central aperture therein through which aperture passes a tube 36. The air bearing port 30 communicates with the tube 36 through a tap hole 38. Lateral passageways 39 are formed in the outer wall 24 and also communicate with the port 30.

The locking port 34 communicates with a passage way 40 formed in the plate 26 via a tap hole 42.

Referring to FIG. 3, the alignment port 32 communicates with a passageway 44 in the plate 26 via a tap hole 46.

In the following description, only one side of the wrist 10 will be described in detail, in that, the parts are identical in each half of the wrist. Slideably received within the inner cylindrical wall 28 is a locking piston 50. The piston 50 includes a shoulder portion 52, the outer surface of which contacts in sliding engagement the inner surface of the inner cylindrical wall 28. An O-ring seal 54 is received in the lower portion of the shoulder 52. The lower portion of the shoulder 52 includes tap hole 64, which communicates with the groove in which the O-ring 54 is secured. The piston 50 is characterized by a central aperture 56, having a necked portion 58. A spring 60 biases the piston 50 outwardly against a retaining ring 62. Disposed between the retaining ring 62 and the neck portion 58 of the piston 50 is an O-ring seal 97.

Secured to the outer cylindrical wall 24 is a dome-shaped socket 80. The socket includes a passageway 82 and a groove 84. The passageway 82 is in communication with the lateral passageway 39 of the air bearing port 30; and the groove 84 circumscribes the inner surface of the socket 80.

A hemispherical link 90 is characterized by a dome-shaped recess 92 which contacts the piston 50. The link 90 terminates in a flanged end 94, which may be secured to either a gripper or to the robot arm as desired.

Disposed between the inner and outer cylindrical walls 24 and 28 is an alignment ring 70. The alignment ring includes an O-ring seal 72. Formed in the base of the ring 70 is a tap hole 74 which intersects a passageway 76. The passageway 76 communicates with the groove within which the O-ring seal 72 is received. The alignment ring 70 is adapted for fluid tight reciprocating motion between the inner and outer cylindrical walls 28 and 24 respectively. The use of pneumatic lines to pressurize a chamber or create a vacuum in a chamber, the associated solenoid valves to open and close the lines and the controls necessary to actuate the valves as desired are all well known in the art and need not be described in detail.

The operation of the invention will be described in reference to the handling of a workpiece, which workpiece at a workstation will require a stamping operation by a press. The acquisition of the workpiece and the movement of the workpiece to and from the workstation is accomplished by prior art robots. The wrist 10 is secured at one end to the robot arm 15 such as a Unimation Inc., model 560 PUMA robot. The gripper 12 is secured to the other end.

The wrist functions in three modes, an air bearing mode, a locking mode and an alignment mode. In the air bearing mode, the air bearing port 30 is pressurized and the locking port 34 and the alignment port 32 are vented to ambient. In this mode, the two links 90, as will be described, are supported on air bearings. In the locking mode, the locking port 34 is pressurized while the air bearing port is vented to ambient. In the alignment mode the alignment port 32 is pressurized, the air bearing port 30 is pressurized; the locking port 34 is vented to ambient, this results in the links being aligned in a standard relationship. After alignment, the device may remain in the air bearing mode or placed in the locking mode as desired. The workpiece is acquired by the gripper 12 with the workpiece being clamped between the fingers of the gripper. At this time, the flanges 94 of the links 90 are in parallel relationship and the wrist 10 is in its locking mode. That is, pressurized air through pneumatic line 20 is introduced into the locking port 34, the tap hole 42 and passageway 40. This pressure drives the piston 50 outwardly, the piston engaging the recess 92 of the link 90 and thus locking the link 90 in a stable position. Pressurized air also flows through tap hole 64 ensuring the O-ring 54 maintains a proper seal. At this time, the air bearing port and alignment port are vented to ambient.

The workpiece is moved to a workstation where the workpiece is placed in a recess or the like, for a stamping operation. Even if it has been properly placed in the recess, there will still occur a transmission of forces passing through the robot arm, if the wrist remains in the locking mode. Accordingly, prior to the stamping operation the wrist 10 is placed in its air bearing mode. In this mode, the locking port 34 is vented to ambient and pressurized air flows through the air bearing port 30 lateral passageway 39 and into passage 82 and groove 84 in the socket 80. The groove 84 in the socket 80 forms with the outer surface of the link 90 a passageway from which the air is dispersed forming an air bearing surface between the link 90 and the socket 80. The pressurized air also flows through tap hole 38, through the tube 36, and is dispersed between the concave surface 92 of the link 90 and the outer surface of the piston 50. This forms an air bearing surface between the piston and underside of the link 90. In this mode, both links are adapted for relative angular movement and thus when the stamping operation is performed the wrist can absorb any vibration transmitted through the gripper to the wrist. Alternatively, the fingers of the gripper could be released or relaxed further absorbing vibration forces directly along its symmetry axis.

After the stamping operation, the wrist is preferably placed in the locking mode, as previously described, with the air bearing port vented to ambient and the workpiece removed from the workstation.

If it is desired to re-align the wrist it is then placed in the alignment mode. The wrist is placed in the air bearing mode with the locking port vented to ambient. Line 18 is pressurized and air enters the alignment port 32 shown most clearly in FIG. 3. The air flows through the tap hole 46 and the passageway 42, and is discharged between the inner and outer cylindrical walls 28 and 24 respectively and the underside of the alignment ring 70. Further, as shown in FIG. 2, air enters tap hole 74 and passageway 76 ensuring that the O-ring 72 maintains a proper seal. This mode results in the alignment rings being driven toward the bases of the links, contacting the links and moving the links to alignment with the flanges being in parallel relationship and the longitudinal axes of the links being coincident. Subsequently, the locking mode is activated, the alignment port 32 vented to ambient and the locking ring retracted to a withdrawn position, as shown in FIG. 3, right side. This withdrawal can either be by applying a vacuum to line 18 by use of a spring (not shown) or by simply allowing the ring to slide back when the positive pressure is removed from the alignment port 32.

The opening and closing of the solenoid valves to ensure the control of the flow of pressurized air to the various ports and the venting of ports to ambient can be accomplished in any desired fashion. That is, depending upon the workpiece being handled when and for how long the alignment mode, the air bearing and the locking modes are required will depend upon the specific task which must be performed on the workpiece.

As compared to serial, cable controlled devices such as those used to position dial indicators and the like, the wrist has several important advantages such as a short moment arm which is important for robots with rotary joints as angular errors are transformed into position errors through the length of the moment arm. Further, the low friction allows the device to passively accommodate forces without transmitting those forces back to the robot arm itself. Lastly, rapid response is achieved which is important when the accommodation has to be made during or within a very short time frame. The use of air bearings enhances the low friction and rapid response characteristics of the wrist and results in low mass and inertia effects which is consistent with the objective of rapid accommodation.

In the description of the preferred embodiment the wrist per se accomodated five (5) degrees of freedom, 2 in position and 3 in rotation. The ability to relax the gripper provided a sixth (6th) degree of freedom, 1 in position, with the result that movement was completely arbitrary. The sixth degree of freedom could otherwise be accomplished by those skilled in the art. For example, the link could be adapted for telescopic motion along its longitudinal axis.

Having described our invention what we now claim is:

1. A linkage device adapted to be secured at one end to a robot arm and to be secured at its other end to a workpiece gripper which comprises:

a housing having one end and another end, an outer wall and an inner wall and a plate member joined to the inner and outer walls, said plate member intermediate the one end and the other end;

link means including a first link secured to the one end of the housing for angular motion;

means to lock the link in an arbitrary fixed position, said means to lock disposed within the inner wall for fluid tight sliding motion within the inner wall and along the longitudinal axis of the housing;

means to align the link in a standard resettable position said means disposed between the inner and outer walls for fluid tight sliding motion between said inner and outer walls;

means to create a fluid bearing surface between the link and the housing; and means to move the means to lock the link and the means to align the link.

2. The linkage device of claim 1, wherein the inner and outer walls are cylindrical walls and wherein the plate member lies in a plane which bisects the housing.

3. The linkage device of claim 2 which includes a second link secured to the other end of the housing for angular motion, means to lock the second link in an arbitrary fixed position, said means to lock disposed within the inner wall for fluid tight sliding motion within the inner wall and along the longitudinal axis of the housing;

means to align the second link in a standard resettable position said means disposed between the inner and outer walls for fluid tight sliding motion between said inner and outer walls;

means to create a fluid bearing surface between the second link and the housing; and means to move the means to lock the second link and the means to align the second link.

4. The linkage device of claim 3 wherein each of the means to lock the links comprises a locking piston received within the inner cylindrical wall.

5. The linkage device of claim 3 wherein each of the means to align the links comprises an alignment ring received between the inner and outer cylindrical walls.

6. The linkage of claim 3 wherein each of the means to create the fluid bearing surfaces comprises means to discharge a fluid stream between the inner surface of the socket and the outer surface of the link received within the socket.

7. The linkage device of claim 1 which includes a link secured to the other end of the housing the links adapted for angular motion one to the other.

8. The linkage device of claim 7, wherein the inner and outer walls are cylindrical walls and wherein the plate member lies in a plane which bisects the housing.

9. The linkage device of claim 8 wherein the housing is cylindrical and wherein the ends each comprise a dome-shaped socket secured to the housing and the links are received in the sockets.

10. The linkage device of claim 9 wherein the means to lock the links comprises locking pistons received within the inner cylindrical walls on each side of the plate member.

11. The linkage device of claim 9 wherein the means to align the link comprises alignment rings received between the inner and outer cylindrical walls on each side of the plate member.

12. The linkage of claim 9 wherein the means to create the fluid bearing surface comprises means to discharge a fluid stream between the inner surface of the dome-shaped sockets and the outer surface of the links received within the sockets.

13. The linkage device of claims 1 or 2 wherein said plate member is perpendicular to the inner and outer walls.

* * * * *